United States Patent
Genevay et al.

(10) Patent No.: US 12,503,231 B2
(45) Date of Patent: Dec. 23, 2025

(54) CENTRALIZED CONTROL SYSTEM FOR AN AIRCRAFT CABIN

(71) Applicant: Safran Seats, Plaisir (FR)

(72) Inventors: Laurent Genevay, Moissy-Cramayel (FR); Frédéric Parage, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 18/832,249

(22) PCT Filed: Jan. 23, 2023

(86) PCT No.: PCT/EP2023/051570
§ 371 (c)(1),
(2) Date: Jul. 23, 2024

(87) PCT Pub. No.: WO2023/144095
PCT Pub. Date: Aug. 3, 2023

(65) Prior Publication Data
US 2025/0145292 A1  May 8, 2025

(30) Foreign Application Priority Data
Jan. 26, 2022 (FR) ........................ 2200662

(51) Int. Cl.
*B64D 11/00* (2006.01)

(52) U.S. Cl.
CPC ............... *B64D 11/0015* (2013.01)

(58) Field of Classification Search
CPC . B64D 11/06; B64D 11/0602; B64D 11/0624; B64D 11/06395
See application file for complete search history.

(56) References Cited

U.S. PATENT DOCUMENTS

| 6,934,137 B2 | 8/2005 | Elliott et al. |
| 10,680,675 B1 * | 6/2020 | Callahan ................ H04B 3/544 |
| 2015/0251759 A1 * | 9/2015 | Ibrahim ............. H04N 21/2146 |
| | | 29/825 |

OTHER PUBLICATIONS

International Application No. PCT/EP2023/051570, International Preliminary Report on Patentability mailed on Jul. 30, 2024, 8 pages.
International Patent Application No. PCT/EP2023/051570, International Search Report and Written Opinion dated Mar. 16, 2023, 16 pages (8 pages of English translation and 8 pages of original document).

* cited by examiner

*Primary Examiner* — Nicholas McFall
*Assistant Examiner* — Justin Michael Heston
(74) *Attorney, Agent, or Firm* — Kilpatrick Townsend & Stockton LLP

(57) ABSTRACT

The present invention relates to a centralized control system comprising a power line on which a centralized control signal is intended to travel, and
a plurality of switching devices, each associated with a seat unit, each switching device having an input connected to the power line and an output connected to a corresponding electronic control unit,
each electronic control unit being capable of controlling a functionality of a corresponding seat unit depending on a state of the output of the switching device, a change whereto is induced by the centralized control signal, such that a functionality can be controlled simultaneously for all of the seat units of the aircraft cabin via a transmission of the centralized control signal.

11 Claims, 3 Drawing Sheets

[Fig. 1]
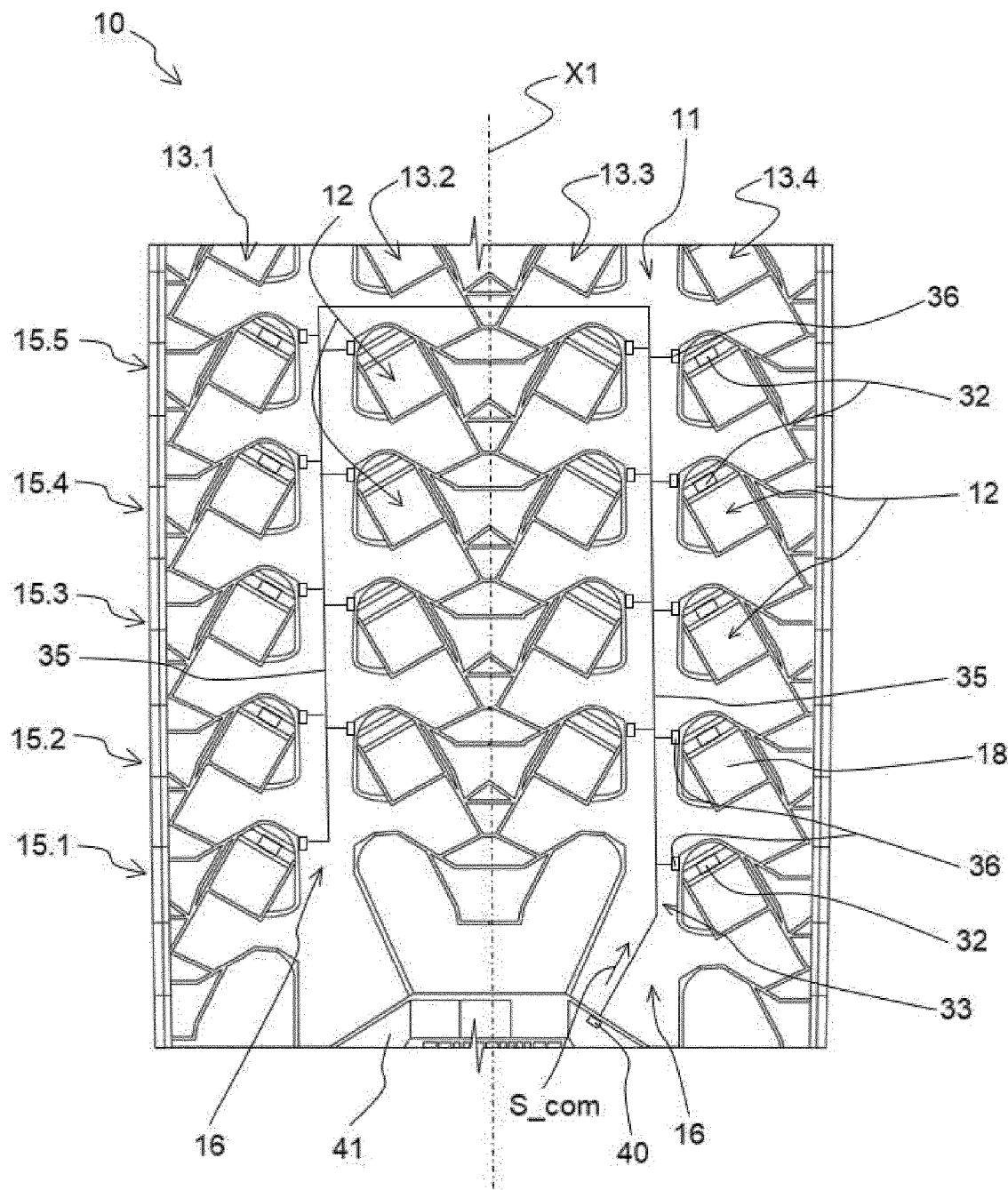

[Fig. 2]
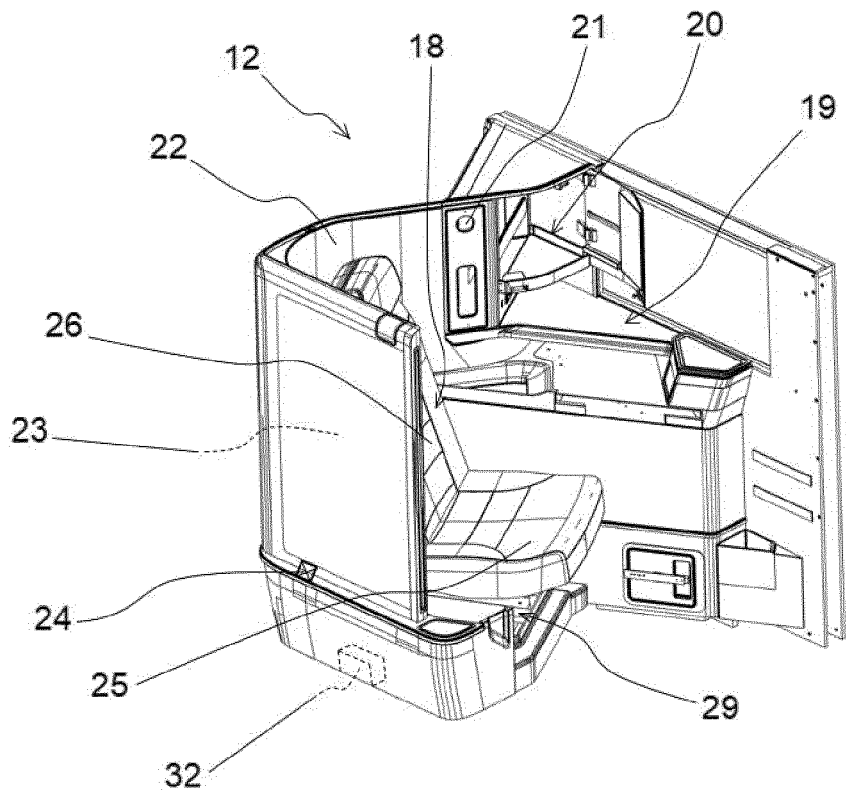
[Fig. 3]
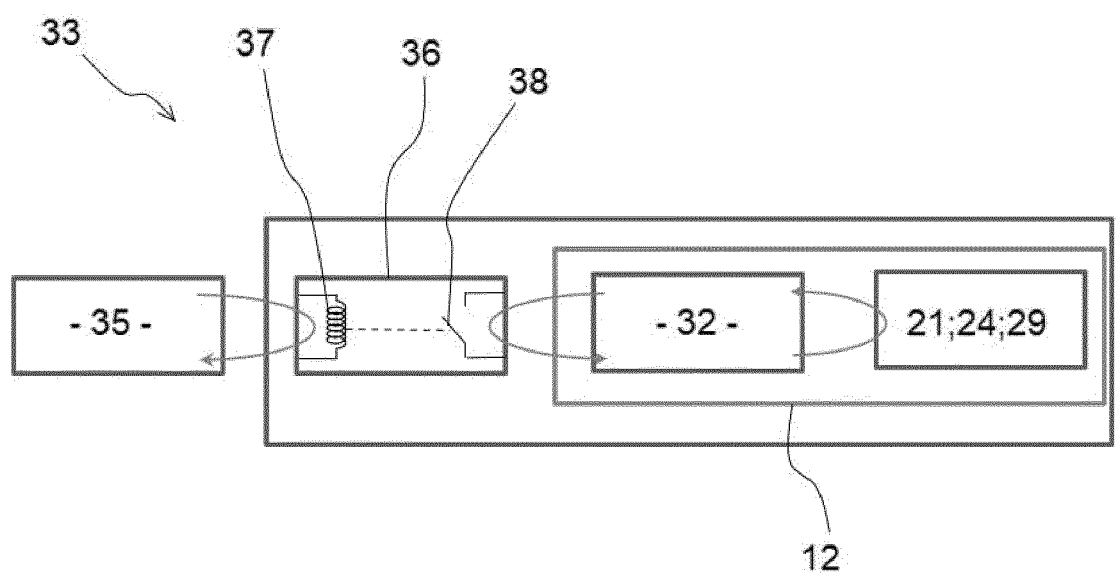

[Fig. 4]
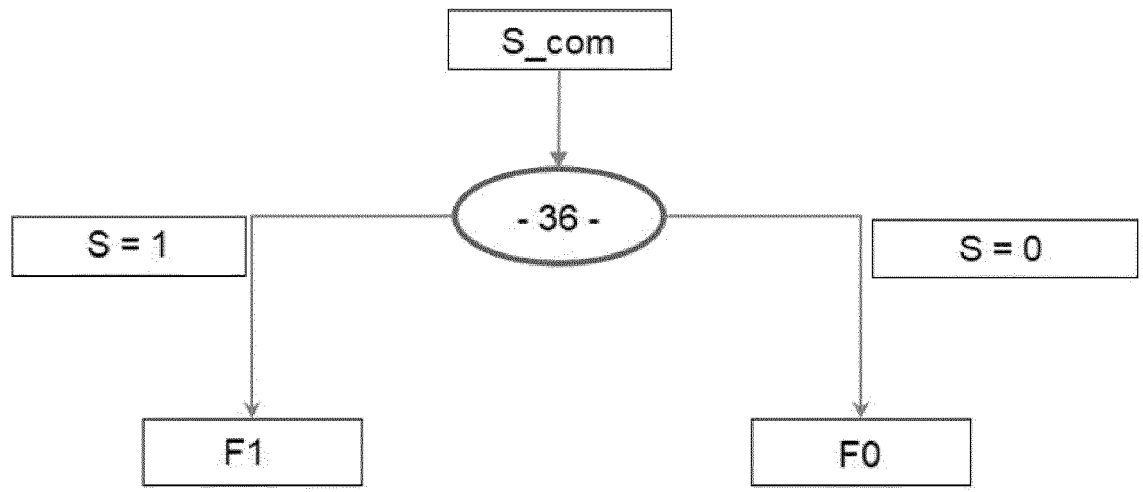
[Fig. 5]
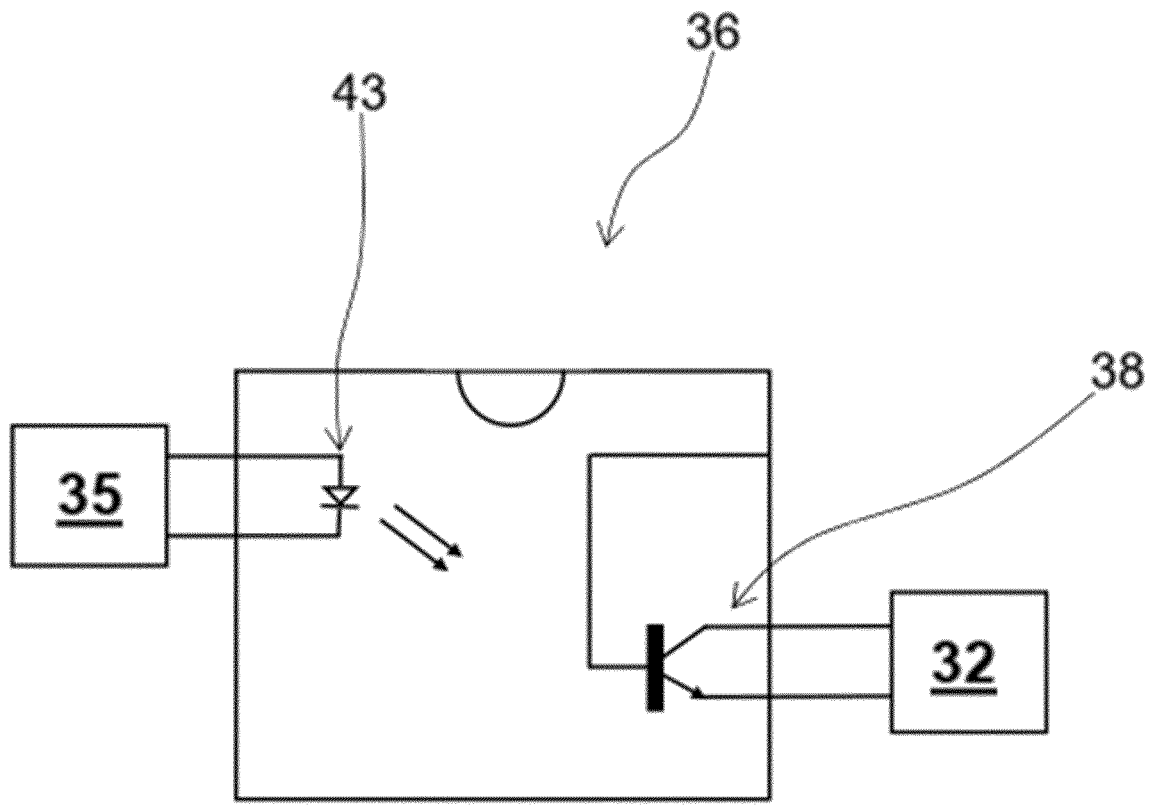

CENTRALIZED CONTROL SYSTEM FOR AN AIRCRAFT CABIN

CROSS REFERENCE TO RELATED APPLICATIONS

This application is a U.S. national phase under 35 U.S.C. § 371 of International Patent Application No. PCT/EP2023/051570, filed on Jan. 23, 2023, which claims priority to French Patent Application No. 2200662, filed on Jan. 26, 2022, the entire contents of both of which are incorporated herein by reference in their entireties.

The present invention relates to a centralized control system for an aircraft cabin. The invention finds a particularly advantageous, but not exclusive, application with "business class" type aircraft seats.

In a manner known per se, "business class" type aircraft seats offer passengers different comfort positions, from a "seating" position also known as TTL position (for "Taxi, Take-off, Landing") to a "reclining" position in which the seat defines a substantially horizontal sleeping surface so that the passenger can lie down. The sleeping surface generally includes the backrest, the seating surface, a leg rest and a footrest, the latter being able to be fixed or linked to the kinematics of the seat.

Intermediate comfort positions are also offered, such as the "relax" position in which the backrest is strongly inclined. Generally, these intermediate positions are obtained by the inclination of the pivoting backrest around a horizontal axis perpendicular to an axis of extension of the seat. The passenger can then remain on the seat during transitions between different positions.

The seats are each associated with an electronic control box capable of controlling the various electrical equipment the seat, in particular one or more actuators making it possible to ensure the movement of the various elements of the seat when moving from one position to another, an ambient lamp, or a closing lock of an access door to an aisle.

The electronic control box can control different functionalities via the control of various electrical equipment, such as:
  authorizing or prohibiting the use of the access door to the aisle,
  seat lighting, or
  putting the seat in the TTL or reclined position.

It is possible to use a data communication bus to carry out centralized control of the electrical equipment for all the seats in the aircraft cabin. However, it is not permitted to control functions related to the safety of the seat due to the low level of security of the intermediate software interfaces. There is therefore a need for a centralized control system that can directly interact securely with the functionalities of the seat units.

The objective of the invention is to effectively meet this need by proposing an assembly for an aircraft cabin in which a plurality of seat units are installed, said assembly comprising:
  a plurality of electronic control units each associated with a seat unit, each electronic control unit being capable of controlling electrical equipment associated with a corresponding seat unit,
  a centralized control system comprising a power line on which a centralized control signal is intended to circulate, said power line being relayed from one seat unit to another inside the aircraft cabin, and
  a plurality of switching devices each associated with a seat unit, each switching device having an input connected to the power line and an output connected to a corresponding electronic control box, each switching device ensuring galvanic isolation between the power line and the output of the switching device connected to the electronic control unit,
  each electronic control unit being capable of controlling a functionality of a corresponding seat unit as a function of a state of the output of the switching device, a change of which is induced by the centralized control signal, so that a functionality can be controlled simultaneously for all seat units in the aircraft cabin via an emission of the centralized control signal.

The invention thus permits, by generating a command at each seat via a highly reliable hardware solution, to meet avionics safety criteria to control any functionality desired by an airline during a flight. In addition, the invention involves a small number of components that are easy to integrate inside an aircraft cabin.

According to one embodiment of the invention, the electrical equipment is chosen from: at least one seat actuator, at least one ambient lamp, an electric lock for blocking an access door to an aisle.

According to one embodiment of the invention, the functionality of all the seat units is chosen from:
  authorizing or prohibiting the use of access doors to the aisle for all the seat units,
  putting the seat units in the same configuration when boarding by turning on the ambient lamps of all the seat units,
  switching the seat units in the same configuration to night mode by turning off the ambient lamps of all the seat units,
  putting all the seat units in an extended position for maintenance purposes,
  putting all the seat units in a seating position in the event of an emergency situation, or
  prohibiting all the seat units from leaving a seating position during a take-off, landing or taxi phase of the aircraft.

According to one embodiment of the invention, said assembly comprises a manual actuator capable of generating a voltage of the centralized control signal when it is actuated.

According to one embodiment of the invention, the switching device includes an electromechanical relay.

According to one embodiment of the invention, the electromechanical relay comprises at its input a control coil to which the power line is electrically connected, and an output switch whose open or closed state is modified depending on a power supply of the control coil by the power line, the electronic control box being electrically connected to said output switch.

According to one embodiment of the invention, the switching device includes an electro-optical relay.

According to one embodiment of the invention, an operating voltage of the power line is a direct voltage less than 42 Volts.

The invention also relates to an aircraft cabin comprising an assembly as previously defined.

According to one embodiment of the invention, the manual actuator is arranged in a space in the aircraft cabin for cabin crew.

The invention further relates to an aircraft comprising an aircraft cabin as previously defined.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of its realization and, if necessary, contribute to its definition, wherein:

FIG. 1 is a schematic top view of a part of an aircraft cabin in which a centralized control system according to the present invention is installed;

FIG. 2 is a perspective view of a seat unit arranged inside the aircraft cabin in FIG. 1;

FIG. 3 is a schematic representation of a system of centralized control integrated into the aircraft cabin in FIG. 1;

FIG. 4 is a functional diagram of the centralized control system for an aircraft cabin;

FIG. 5 is a schematic representation of a variant embodiment of a switching device including an electro-optical relay;

Identical, similar, or analogous elements have the same reference throughout the figures.

FIG. 1 shows an aircraft cabin 10 having a longitudinal axis X1 comprising an arrangement 11 of seat units. This arrangement 11 is formed by a plurality of seat units 12 arranged in several columns 13.1-13.4 extending along the longitudinal axis X1 of the aircraft cabin 10 and several rows 15.1-15.5 extending transversely to the longitudinal axis X1 of the aircraft cabin 10.

The seat units 12 have an axis X2 which can form a non-zero angle with respect to the longitudinal axis X1 in a so-called "herringbone" configuration as shown. Alternatively, the seat units 12 may extend parallel to the longitudinal axis X1 of the aircraft cabin in a so-called "staggered" configuration. The seat units 12 may be oriented in the direction of movement of the aircraft or in an opposite direction relative to the direction of movement of the aircraft.

In the example shown, the plurality of seat units 12 are arranged in four columns of seats 13.1-13.4. We can thus distinguish two side seat columns 13.1, 13.4 positioned along a side wall of the aircraft cabin 10. The seat arrangement 11 also includes a central group including two columns 13.2, 13.3 of seat units 12. Each side column 13.1, 13.4 is separated from the central group by an aisle 16. Of course, the number of columns and the number of rows of seat units 12, as well as the number of aisles may vary according to the configuration the aircraft cabin 10.

As can be seen in FIG. 2, a seat unit 12 comprises a seat 18 associated with a side console 19 extending along one side of the seat 18. The side console 19 may include a vertical storage space 20 comprising one or more elements from a literature pouch, a bottle holder, or a minibar. The choice of storage elements is configurable according to the wishes of the airline. The seat unit 12 may also include one or more ambient lamps 21.

Furthermore, a privacy shell 22 extends at least partly around the seat 18 so as to delimit a semi-enclosed space around the passenger. It is also possible to provide an access door 23 to an aisle 16. This door 23 is movable between an open position providing access to the aisle 16, as shown in FIG. 2, and a closed position blocking access to the aisle 16. This door 23 can also be associated with an electric lock 24 which can be controlled to maintain the door 23 in the closed state or in the open state.

The seat 18 comprises a seating surface 25 and a backrest 26, in particular adjustable in inclination. The seat 18 may also include a leg rest. The seat 18 is advantageously provided with kinematics allowing it to be movable between a "seating" position and a "lying" position. In the "seating" position, also called TTL position (for "Taxi, Take-Off, Landing"), the seat 18 is configured to define a sitting position of a passenger in particular imposed during takeoff, landing, when maneuvering the aircraft on the ground, or during turbulence in flight. In the "reclining" position, the seat 18 is configured to define a sleeping surface for the passenger, advantageously substantially horizontal. Intermediate comfort positions are also offered, such as the "relax" position in which a backrest 26 of the seat 18 is strongly inclined. The movement of the different elements of the seat 18 from one position to another is ensured by one or more actuators 29.

Each seat unit 12 comprises an electronic control unit 32 capable of controlling the electrical equipment associated with the corresponding seat unit 12. The electrical equipment is chosen from: the actuator(s) 29 for the seat 18, at least one ambient lamp 21, or the electric lock 24 for blocking the access door 23.

As can be seen in FIGS. 1 and 3, a centralized control system 33 permits to control a functionality applied to a plurality of seat units 12 in the aircraft cabin. For this purpose, the centralized control system 33 comprises a power line 35 on which a centralized control signal S_com is intended to circulate. The power line 35 is relayed from one seat unit 12 to another inside the aircraft cabin 10. The power line 35 may include one or more electrical cables, in particular an electrical cable connected to an electric potential which can vary according to a command from a manual actuator 40 and an electric cable connected to the ground.

In addition, each of a plurality of switching devices 36 is associated with a seat unit 12. Each switching device 36 includes an input connected to the power line 35 and an output connected to a corresponding electronic control unit 32.

The switching device 36 advantageously takes the form of an electromechanical relay. The electromechanical relay 36 ensures galvanic isolation between the power line 35 and the output of the relay connected to the electronic control unit 32. The electromechanical relay 36 has at its input a control coil 37 to which the power line 35 is electrically connected and an output switch 38 whose open or closed state is modified depending on a power supply of the control coil 37 by the power line 35. The electronic control unit 32 is electrically connected to the output switch 38.

Each electronic control unit 32 is capable of controlling a functionality of a corresponding seat unit 12 according to a state of the output of the switching device 36, a change of which is induced by the centralized control signal S_com.

A functionality can thus be controlled simultaneously for all the seat units 12 in the aircraft cabin 10 via the emission of a control centralized signal S_com. The functionality can be obtained by activating or inhibiting one or more electrical equipment of the seat units 12.

The functionality of all the seat units 12 is notably chosen from:
  authorizing or prohibiting the use of access doors 23 to the aisle 16 for all of the seat units 12,
  putting the seat units 12 in the same configuration when boarding by turning on the ambient lamps 21 of all the seat units 12,
  putting the seat units 12 in the same configuration in a night mode by turning off the ambient lamps 21 of all the seat units 12,
  putting all the seat units 12 in an extended position for maintenance purposes, putting all the seat units 12 in a seating position in the event of an emergency situation, or prohibiting all of the seat units 12 from leaving a seating position during a take-off, landing, or taxi phase of the aircraft.

Advantageously, a manual actuator 40 is able to generate a voltage of the centralized control signal S_com during its actuation. The manual actuator 40 is preferably arranged in a space 41 in the aircraft cabin for cabin crew, as shown in FIG. 1. The manual actuator 40 can thus be operated centrally by an authorized operator. Thus the generation of the centralized control signal S_com requires manual action in order to guarantee the security of the system.

The manual actuator 40 may take the form of a physical actuator, such as a push button, a switch, a slider, a lever, or any other physical actuator adapted to the application, but also the form of a logical actuator, such as a touch screen of a dedicated human-machine interface, a telephone, or any other logical actuator adapted to the application.

The system according to the invention is preferably a low voltage type system, that is to say the operating voltage of the power line 35 is a direct voltage less than 42 volts. The voltage applied to the output switch 38 in the open state is a direct voltage preferably between 5V and 28V, and for example 12V. Of course, voltage may vary according to the application.

It is described below, with reference to FIG. 4, an example of implementation of the invention making it possible to control a functionality on all the seat units 12 in the aircraft cabin 10.

When the cabin crew member activates the manual actuator 40, this generates on the power line 35 a control signal S_com having for example a DC voltage of 28V. The control signal S_com is applied to the first seat unit 12 and relayed from one seat unit to another up to the last seat unit 12 via the power line 35. All the seat units 12 in the aircraft cabin 10 then have the control signal S_com and its desired active state.

At each seat unit 12, the electromechanical relay 36 connected to the power line 35 is powered via the control coil 37, which has the effect of closing the output switch 38. The electronic control unit 32 then detects a current flow on the logic output. The state of the output S then changes to 1. After reading the state of the relay, the electronic control unit 32 controls the functionality F1 corresponding to S=1. For example, the electronic control unit 32 activates the power supply of an ambient lamp 21. All the electronic control units 32 in the cabin having the same desired value, all of the ambient lamps 31 in the seat units 12 in the aircraft cabin 10 light up.

When the cabin crew member does not activate the manual actuator 40, the control signal S_com on the power line 35 has by example a voltage of 0V. At each seat unit 12, the electromechanical relay 36 connected to the power line 35 is not energized, so that the output switch 38 is in the open state. The electronic control unit 32 then does not detect any flow of current at the logic output. The state of the output S then changes to 0. After reading the state of the output S of the relay, the electronic control unit 32 then does not control any functionality or, where applicable, the functionality F0 corresponding to S=0.

Of course, the states of the electromechanical relay 36 can be inverted in the case where the switch is a normally closed switch. In this case, the state S=1 when the relay 36 is not supplied at its input by the power line 35 and the state S=0 when the relay 36 is supplied at its input by the power line 35.

Alternatively, as illustrated in FIG. 5, the switching device 36 advantageously takes the form of an electro-optical relay, that is to say an optocoupler. The galvanic isolation between the power line 35 and the output of the switching device 36 connected to the electronic control unit 32 is then ensured by the vacuum or air between a light source 43, typically an infrared light-emitting diode (LED), which is electrically connected at its input to the power line 35 which supplies it with current, and an output switch 38 which is then a output switching photoreceptor, typically a photodiode or a phototransistor. The electronic control unit 32 is electrically connected to the output switch 38.

Alternatively, the electromechanical relay 36 could be replaced with a power contactor, a power transistor, or any other switching device 36 making it possible to isolate the power line 35 from the output of the switching device 36.

Of course, the different characteristics, variants and/or forms of embodiment of the present invention can be associated with each other in various combinations to the extent that they are not incompatible with one another or exclusive from one another.

Furthermore, the invention is not limited to the embodiments described above and provided solely by way of example. It encompasses various modifications, alternative forms and other variants that those skilled in the art may consider in the context of the present invention and in particular all combinations of the different modes of operation described above, which can be taken separately or in combination.

The invention claimed is:

1. An assembly for an aircraft cabin in which a plurality of seat units is installed comprising:

a plurality of electronic control units each being associated with a seat unit, each electronic control unit being capable of controlling electrical equipment associated with a corresponding seat unit, wherein said assembly further comprises:

a centralized control system comprising a power line on which a single centralized control signal is intended to circulate, said power line being relayed from one seat unit to another inside the aircraft cabin; and a plurality of switching devices each being associated with a seat unit, each switching device having an input connected to the power line and an output connected to a corresponding electronic control unit, each switching device ensuring galvanic isolation between the power line and the output of the switching device connected to the electronic control unit, each electronic control unit being able to control a single functionality of a corresponding seat unit according to a state of the output of the switching device, a change of which is induced by the single centralized control signal, such that the single functionality can be controlled simultaneously for all the seat units in the aircraft cabin via an emission of the single centralized control signal, wherein said assembly comprises a manual actuator capable of generating the single centralized control signal during its actuation, wherein upon activation of the manual actuator by a cabin crew member, the single centralized control signal having a DC voltage is generated on the power line, so that all seat units in the aircraft cabin receive the single centralized control signal and its desired active state, wherein at each seat unit, the switching device connected to the power line is powered so that a logic output of the switching device is closed, wherein the electronic control unit detects a current flow on the logic output of the switching device so that a state of the logic output of the switching device changes to 1 and the electronic control unit controls the single functionality corresponding to the state of the logic output of the switching device, and wherein upon no activation of the manual actuator, the single control signal on the power line has a voltage of 0V so that at each seat unit, the switching device connected to the power line is not energized, wherein the electronic control unit does not detect any flow of current at the logic output of the switching device, so that a state of the logic output of the switching device changes to 0 and the electronic control unit does not control any functionality.

2. The assembly according to claim 1, wherein the electrical equipment is chosen from: at least one seat actuator, at least one ambient lamp, and an electric lock for blocking an access door to an aisle.

3. The assembly according to claim 2, wherein the functionality of all the seat units is chosen from:
   authorizing or prohibiting the use of access doors to the aisle for all the seat units;
   putting the seat units in the same configuration when boarding by turning on the ambient lamps in all the seat units;
   switching the seat units in the same configuration to a night mode by turning off the ambient lamps in all the seat units;
   putting all the seat units in an extended position for maintenance purposes;
   putting all the seat units into a seating position in the event of an emergency situation; or
   prohibiting all the seat units from leaving a seating position during a take-off, landing or taxi phase of the aircraft.

4. The assembly according to claim 1, wherein the switching device includes an electromechanical relay.

5. The assembly according to claim 4, wherein the electromechanical relay comprises at its input a control coil to which the power line is electrically connected and an output switch whose open or closed state is modified depending on a power supply of the control coil by the power line, the electronic control unit being electrically connected to said output switch.

6. An aircraft cabin comprising an assembly as defined according to claim 1.

7. Aircraft cabin according to claim 6, wherein a manual actuator is arranged in a space in the aircraft cabin for cabin crew.

8. An aircraft comprising an aircraft cabin as defined according to claim 6.

9. The assembly according to claim 1, wherein each switching device of the plurality of switching devices is an electro-optical relay.

10. An assembly for an aircraft cabin in which a plurality of seat units is installed comprising:
   a plurality of electronic control units each being associated with a seat unit, each electronic control unit being capable of controlling electrical equipment associated with a corresponding seat unit, wherein said assembly further comprises:
   a centralized control system comprising a power line on which a single centralized control signal is intended to circulate, said power line being relayed from one seat unit to another inside the aircraft cabin; and
   a plurality of switching devices each being associated with a seat unit, each switching device having an input connected to the power line and an output connected to a corresponding electronic control unit, each switching device ensuring galvanic isolation between the power line and the output of the switching device connected to the electronic control unit, wherein operating voltage of the power line is a DC voltage equal to 28 Volts,
   each electronic control unit being able to control a single functionality of a corresponding seat unit according to a state of the output of the switching device, a change of which is induced by the single centralized control signal, such that the single functionality can be controlled simultaneously for all the seat units in the aircraft cabin via an emission of the single centralized control signal,
   wherein said assembly comprises a manual actuator capable of generating the single centralized control signal during its actuation,
   wherein upon activation of the manual actuator by a cabin crew member, the single centralized control signal having a DC voltage is generated on the power line, so that all seat units in the aircraft cabin receive the single centralized control signal and its desired active state,
   wherein at each seat unit, the switching device connected to the power line is powered so that a logic output of the switching device is closed,
   wherein the electronic control unit detects a current flow on the logic output of the switching device so that a state of the logic output of the switching device changes to 1 and the electronic control unit controls the single functionality corresponding to the state of the logic output of the switching device, and
   wherein upon no activation of the manual actuator, the single control signal on the power line has a voltage of 0V so that at each seat unit, the switching device connected to the power line is not energized, wherein the electronic control unit does not detect any flow of current at the logic output of the switching device, so that a state of the logic output of the switching device changes to 0 and the electronic control unit does not control any functionality.

11. An assembly for an aircraft cabin in which a plurality of seat units is installed comprising:
   a plurality of electronic control units each being associated with a seat unit, each electronic control unit being capable of controlling electrical equipment associated with a corresponding seat unit, wherein said assembly further comprises:
   a centralized control system comprising a power line on which a single centralized control signal is intended to circulate, said power line being relayed from one seat unit to another inside the aircraft cabin; and
   a plurality of switching devices each being associated with a seat unit, each switching device of the plurality of switching devices is an electro-optical relay, each switching device having an input connected to the power line and an output connected to a corresponding electronic control unit, each switching device ensuring galvanic isolation between the power line and the output of the switching device connected to the electronic control unit,
   each electronic control unit being able to control a single functionality of a corresponding seat unit according to a state of the output of the switching device, a change of which is induced by the single centralized control signal, such that the single functionality can be controlled simultaneously for all the seat units in the aircraft cabin via an emission of the single centralized control signal, wherein said assembly comprises a manual actuator capable of generating the single centralized control signal during its actuation, wherein upon activation of the manual actuator by a cabin crew member, the single centralized control signal having a DC voltage is generated on the power line, so that all seat units in the aircraft cabin receive the single centralized control signal and its desired active state, wherein at each seat unit, the switching device connected to the power line is powered so that a logic output of the switching device is closed, wherein the electronic control unit detects a current flow on the logic output of the switching device so that a state of the logic output of the switching device changes to 1 and the electronic control unit controls the single functionality corresponding to the state of the logic output of the switching device, and wherein upon no activation of the manual actuator, the single control signal on the power line has a voltage of 0V so that at each seat unit, the switching device connected to the power line is not energized, wherein the electronic control unit does not detect any flow of current at the logic output of the switching device, so that a state of the logic output of the switching device changes to 0 and the electronic control unit does not control any functionality.

\* \* \* \* \*